United States Patent [19]

Nakamura et al.

[11] Patent Number: 4,834,374

[45] Date of Patent: May 30, 1989

[54] OBJECT IMAGE INDICATING APPARATUS

[75] Inventors: Shigeichi Nakamura; Koichi Tashiro, both of Tokyo, Japan

[73] Assignee: Namco Ltd., Tokyo, Japan

[21] Appl. No.: 139,077

[22] Filed: Dec. 22, 1987

Related U.S. Application Data

[63] Continuation of Ser. No. 812,867, Dec. 23, 1985, abandoned, which is a continuation of Ser. No. 475,257, Mar. 14, 1983, abandoned.

[30] Foreign Application Priority Data

Aug. 31, 1982 [JP] Japan ................................ 57-151282

[51] Int. Cl.[4] ............................................ G06K 15/00

[52] U.S. Cl. ................................ 273/1 E; 273/1 ES; 273/DIG. 28; 273/85 G

[58] Field of Search ............. 340/731; 273/1 E, 1 ES, 273/85 G, DIG. 28

[56] References Cited

U.S. PATENT DOCUMENTS

| | | | |
|---|---|---|---|
| 4,107,665 | 8/1978 | Mayer et al. | 340/731 |
| 4,107,786 | 8/1978 | Masaki et al. | 340/731 |
| 4,322,717 | 3/1982 | Iida | 340/731 |
| 4,409,591 | 10/1983 | Simkovitz | 340/731 |

*Primary Examiner*—Leo P. Picard
*Attorney, Agent, or Firm*—Koda and Androlia

[57] ABSTRACT

An object image indicating apparatus which reads out coordinate picture element information of the object from an object image memory in which object images are stored as coordinate picture element information in the vertical or horizontal direction and raster image-indicates on a CRT, includes a scale-up or scale-down circuit which scales up or down the coordinate picture element information read out of the object image memory to either one of the vertical or horizontal direction at least at a certain established scale factor, whereby the object can be indicated on the CRT at the scale factor to either one of the vertical or horizontal direction at least, and especially, a plurality of the objects can be continuously image-indicated on the CRT with scale-up or scale-down at requested scale factors.

2 Claims, 9 Drawing Sheets

| CHARACTOR CODE | CORRESPONDING ADDRESS | | | | | | | | |
|---|---|---|---|---|---|---|---|---|---|
| | | 0 | 0 | 0 | 0 | 0 | 0 | 0 | 0 |
| 01 | $ 3000 | 0 | 0 | 0 | 1 | 1 | 0 | 0 | 0 |
| | 1 | 0 | 0 | 1 | 1 | 1 | 1 | 0 | 0 |
| | 2 | 0 | 1 | 1 | 1 | 1 | 1 | 1 | 0 |
| | 3 | 1 | 1 | 1 | 2 | 2 | 1 | 1 | 1 |
| | 4 | 1 | 1 | 1 | 2 | 2 | 1 | 1 | 1 |
| | 5 | 0 | 1 | 1 | 1 | 1 | 1 | 1 | 0 |
| | 6 | 0 | 0 | 1 | 1 | 1 | 1 | 0 | 0 |
| | 7 | 0 | 0 | 0 | 1 | 1 | 0 | 0 | 0 |
| 02 | $ 3008 | 1 | 1 | 0 | 0 | 0 | 0 | 1 | 1 |
| | 9 | 1 | 1 | 1 | 0 | 0 | 1 | 1 | 1 |
| | A | 0 | 1 | 1 | 0 | 0 | 1 | 1 | 0 |
| | B | 0 | 1 | 1 | 1 | 1 | 1 | 1 | 0 |
| | C | 0 | 1 | 1 | 1 | 1 | 1 | 1 | 0 |
| | D | 0 | 1 | 1 | 0 | 0 | 1 | 1 | 0 |
| | E | 1 | 1 | 1 | 0 | 0 | 1 | 1 | 1 |
| | F | 1 | 1 | 0 | 0 | 0 | 0 | 1 | 1 |
| 03 | $ 3010 | 0 | 0 | 0 | 0 | 0 | 0 | 0 | 0 |

FIG. 2

| (VERTICAL COORDINATE VALUES) | (PICTURE ELEMENT INFORMATION OF EACH LINE) | | | | | | | |
|---|---|---|---|---|---|---|---|---|
| $0 | 0 | 0 | 0 | 1 | 1 | 0 | 0 | 0 |
| $1 | 0 | 1 | 1 | 1 | 1 | 1 | 1 | 0 |
| $2 | 1 | 1 | 1 | 2 | 2 | 1 | 1 | 1 |
| $3 | 0 | 0 | 1 | 1 | 1 | 1 | 0 | 0 |
| $4 | 0 | 0 | 0 | 0 | 0 | 0 | 0 | 0 |
| $5 | 0 | 0 | 0 | 0 | 0 | 0 | 0 | 0 |
| $6 | 0 | 0 | 0 | 0 | 0 | 0 | 0 | 0 |
| $7 | 0 | 0 | 0 | 0 | 0 | 0 | 0 | 0 |

FIG. 5

| (VERTICAL COORDINATE VALUES) | (PICTURE ELEMENT INFORMATION OF EACH LINE) | | | | | | | |
|---|---|---|---|---|---|---|---|---|
| $0 | 0 | 0 | 0 | 1 | 1 | 0 | 0 | 0 |
| $1 | 0 | 0 | 0 | 1 | 1 | 0 | 0 | 0 |
| $2 | 0 | 0 | 1 | 1 | 1 | 1 | 0 | 0 |
| $3 | 0 | 1 | 1 | 1 | 1 | 1 | 1 | 0 |
| $4 | 0 | 1 | 1 | 1 | 1 | 1 | 1 | 0 |
| $5 | 1 | 1 | 1 | 2 | 2 | 1 | 1 | 1 |
| $6 | 1 | 1 | 1 | 2 | 2 | 1 | 1 | 1 |
| $7 | 1 | 1 | 1 | 2 | 2 | 1 | 1 | 1 |
| $8 | 0 | 1 | 1 | 1 | 1 | 1 | 1 | 0 |
| $9 | 0 | 0 | 1 | 1 | 1 | 1 | 0 | 0 |
| $A | 0 | 0 | 1 | 1 | 1 | 1 | 0 | 0 |
| $B | 0 | 0 | 0 | 1 | 1 | 0 | 0 | 0 |

FIG. 6

OBJECT IMAGE INDICATING APPARATUS

This is a continuation of application Ser. No. 812,867, filed Dec. 23, 1985 now abandoned.

BACKGROUND OF THE INVENTION

1. Field of The Invention

This invention relates to object image indicating apparatus, and more particularly to an object image indicating apprapparatus in which an object image memory stores object images as coordinate picture element information in the vertical or horizontal direction and the coordiante picture element information is read out of the object image memory to be raster image-indicated on a CRT.

2. Prior Art

There has been known an object image indicating apparatus which indicates a specified picture image as an object on a CRT image display screen with a determined scale up or scale down factor, and is widely used for various types of simulators, design drawing systems, video games and other instruments.

For example, a flight simulator to be used for training the crews of the airplane models a real airplane cockpit and is equipped with a CRT in front of operating seats together with meters and gauges to display picture scenes of surface during flight. In case of shamming a taking-off or a landing of airplane it is required to display the pictures of runway and its vicinity with a scale up or scale down factor in order to simulate a real flight. The object image indicating apparatus is thus used in the above mentioned application.

For another example, in design drawing systems there are many cases in which a part of or all of the certain drawing displayed on a CRT is required to get scaled up or down. The object image indicating apparatus is thus used in the above mentioned application.

Furthermore, in recently popularized video games, a target displayed on a CRT is indicated with scale up or scale down in accordance with a game in progression in order to make this game more enjoyable. The object image indicating apparatus is thus used in the above mentioned application.

FIG. 1 is a schematic block diagram showing a simple composition of the above mentioned image indicator, wherein, as shown in FIG. 2, object images are stored in a object image memory 10 as coordinate picture element information in the vertical or horizontal direction, and character codes for reading the objects out are provided for the respective objects thus stored. Then, the object images specified by the character codes are read out of the object image memory 10 by an image processing circuit 12 and raster image-indicated on a CRT 14.

Here, since read-out actions of object images from the object image memory 10 are effected on each line in responce to a horizontal synchronizing signal of raster scanning, an object is raster image-displayed on the CRT, the sizes of the object displayed on the CRT are determined by the sizes stored in the object image memory 10. In other words, the sizes displayed on the CRT are determined by the numbers of memory bit being used for the object images to be sorted in the object image memory 10.

Accordingly, in order to display an object on the CRT with scale up or scale down by using the object image indicating apparatus a plurality of object images must be stored in the object image memory 10 with different sizes per one object, thereby presenting such a disadvantage that numbers of the object images must be stored in the object image memory 10 per one object in order to have an object be displayed on the CRT with more precise scale up or scale down factor.

Therefore, since in the object image indicating apparatus in the prior art a plurality of object images must be stored with different sizes for one kind of object, the object image memory 10 must use a memory device with extremely large storage, thereby also presenting such disadvantage that the small memory storage could limit the kinds of objects to be stored in the object image memory 10.

SUMMARY OF THE INVENTION

The present invention has been developed in view of the above described disadvantages of the prior art and has as its object the provision of an object image indicating apparatus, wherein an object can be displayed at a predetermined scale up or scale down factor to at least either one of the vertical or the horizontal direction on a CRT.

In order to achieve the above described object of the present invention, the apparatus according to the present invention features that the object image indicating apparatus which reads out coordinate picture element information of the object from an object image memory in which object images are stored as coordinate picture element information in the vertical or the horizontal direction, and raster image-indicates on a CRT, comprising a scale-up or scale-down circuit which scales up or down the coordinate picture element information read out of the object image memory to either one of the vertical or the horizontal direction at least at a certain established scale factor, whereby the object can be indicated on the CRT at the scale factor to either one of the vertical or the horizontal direction at least.

Also, the present invention has as its another object the provision of an object image indicating apparatus in a video game machine in which a plurality of objects can be reaster image-indicated on a CRT, wherein an object can be displayed on a CRT at a predetermined scale up or scale down factor to any of the vertical and the horizontal directions without increasing any memory storage in an object image memory.

In order to accomplish the above mentioned object of the present invetion, the apparatus according to the present invention also features that the object image indicating apparatus in a video game machine which reads out coordinate picture element information of the object from an object image memory in which a plurality of object images are respectively stored as coordinate picture element information in the vertical or horizontal direction and raster image-indicates on a CRT, includes object identification signal which specifies the indicating object in accordance with the external input signal and predetermined program, line signal and horizontal address signal which direct the indicating position of the object, vertical scale factor signal showing the indicating scale factor of the object and a processing circuit which processes and supplies this vertical scale factor signal at every object; an object image memory which respectively stores the signals supplied from the processing circuit; a synchronizing signal generator supplying horizontal synchornizing signal for raster image indication and line counting signal directing raster scanning position; a control circuit reading out all of the indicating data of each object stored in the object data memory one after another at every output of horizontal synchronizing signal; an adder which adds line signal read out of the object data memory and line counting signal output from the synchronizing signal generator and outputs line position signal of the object; a comparator which judges whether or not a picture image of the object can be indicated on the CRT on the basis of the line position signal output from the adder and the vertical scale factor signal read out of the object data memory and outputs match signal when the picture image can be indicated; a line converter which reads out coordinate picture element information from the object image memory on the basis of established scale factor codes consisting of the codes which are predetermined line selecting signals in correspondence with the respective established scale factors; a shift register which parallel-series converts and supplies picture element information read out by the line converter when the match signal is output from the comparator; buffer memories writing and storing picture element information as picture image signal for raster scanning out from the shift register after parallel-series conversion; address counters directing write-in address to the buffer memories; and a pulse generating circuit supplying write-in trigger pulse of pulse number ratio in accordance with the established scale factor to the address counters and scaling up or down write-in address area which the address counters direct with the pulse number ratio, whereby the object can be indicated on the CRT at the established scale factor to any vertical and horizontal directions by means of raster scanning on the CRT one after another the picture image signal writen into the buffer memories.

BRIEF DESCRIPTION OF THE DRAWINGS

FIG. 2 is an explanatory view of the object images stored in the object image memory;

FIGS. 5 and 6 are explanatory views of reading-out coordinate picture element information by a line converter;

DETAILED DESCRIPTION OF THE INVENTION

Description will hereunder be given of the preferred embodiments of the present invention with reference to the drawings.

The like numerals denote the like elements corresponding to the ones in the prior art and their descriptions will be omitted.

Figure 3:
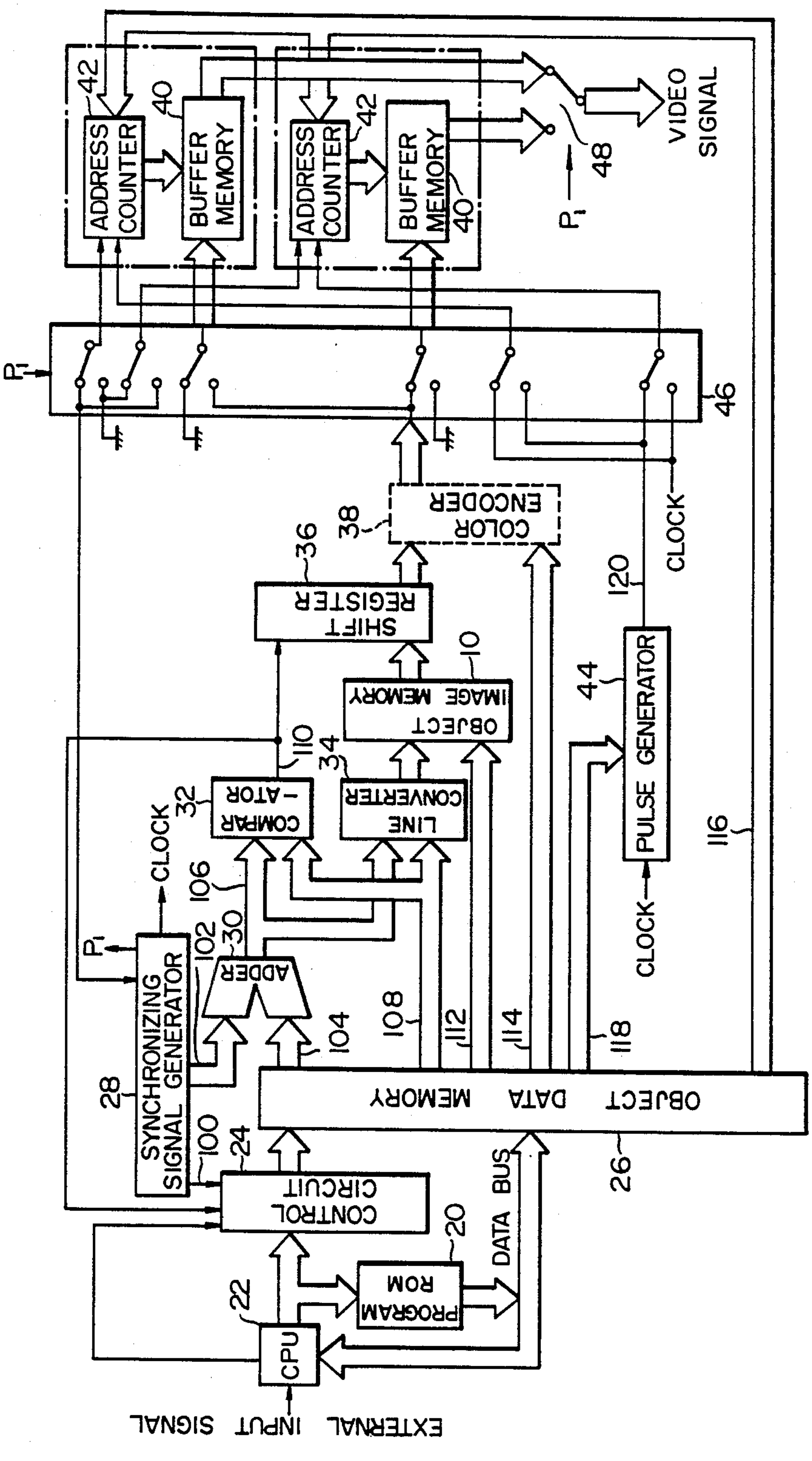
FIG. 3 is a block diagram showing a preferred embodiment of the object image indicating apparatus according to the present invention.

FIG. 3 shows a preferred embodiment of an object image indicating apparatus according to the present invention in which an object image memory 10 stores object images as coordinate picture element information in the vertical or horizontal direction and the coordinate picture element information is read out of the object image memory 10 to be raster image-indicated on a CRT.

The present invention is characterized in that a scale up or scale down circuit is provided so that the coordinate picture element information read out of the object image memory 10 can be processed at a predetermined scale up or down factor to at least either one of the vertical or the horizontal direction, and the object can be thereby indicated at the predetermined factor to at least either one of the vertical or horizontal direction on the CRT.

In the embodiment, per one kind of object, as shown in FIG. 2, one object image is stored in the object image memory 10 as $8 \times 8$ bit coordinate picture element information in the vertical and horizontal directions. Since plural kinds of object images are generally stored in the object image memory 10, each of the object images is established for each of the charactor codes for identification as shown in FIG. 2, and a predetermined address is established in the information of the respective lines composing the coordinate picture element information of the respective object images. The read-out actions of the object images from the object image memory 10 are preformed by means of specifying an object with the basis of a charactor code and specifying the information of a line read out of its coordinate picture element information with the basis of an address signal.

Then, the coordinate picture element information of the object images thus stored in the object image memory 10 is input to the scale up or scale down circuit, wherein this information is processed at a predetermined scale up or scale down factor to both of the vertical and the horizontal directions, and is raster image-indicated at the predetermined factor on the CRT.

Figure 1:
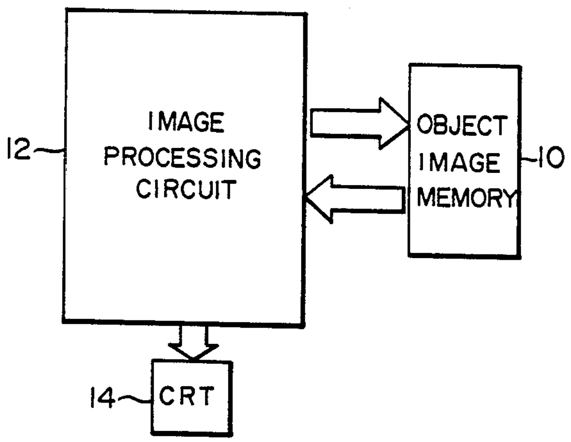
FIG. 1 is an explanatory view of the object image indicating apparatus in the prior art.
Figure 4:
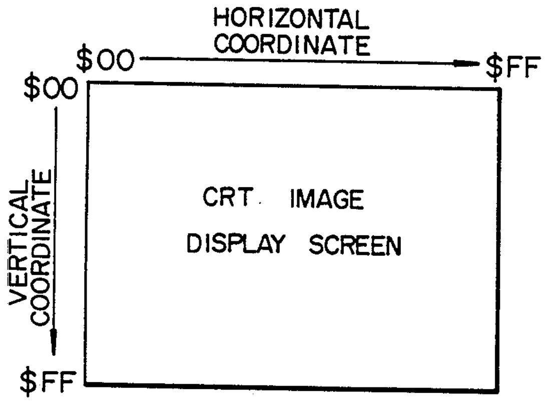
FIG. 4 is an explanatory view on a CRT displaying picture images of objects.

As the CRT to be used in the embodiment, as shown in FIG. 4, its image display screen of hexadecimal digit notation with the vertical and the horizontal coordinate signals from $00 through SFF. ($ shows that its succeeding number has hexadecimal digit notation.)

Description will hereunder be made in order about the concrete composition of circuits which read out the coordinate picture element information of every object thus stored in the object image memory 10 and which indicate this information on the CRT.

(1) Setting of Picture Image Information

Firstly, in order to image-indicate the object on the CRT it becomes necessary to set the picture image information.

In the indicator of the embodiment, a preset predetermined program is stored in a program memory 20. Then, a CPU 22 processes at every object an object identification signal specifying an object to be indicated, a line signal which indicates a displayed position on the CRT, and a horizontal position signal and a vertical scale factor signal and a horizontal scale factor signal which indicate a display scale factor of an object on the CRT in response to a given program signal supplied from this program memory 20 and an external input signal supplied from outside. In the above described indicating data for each object, its address is inputted to an object data memory 26 by way of a control circuit, and its data is directly inputted to the object data memory 26. When the object data memory 26 thus inputs the indicating data of each object, the indicating data of each object is written and stored as an object 1, an object 2, - - - , and object N in accordance with every input object.

The indicating data for each object to be displayed on the CRT image display screen is thus written in the object data memory 26.

(2) Read-out of Picture Image Information

When the indicating data of every object is set in the object data memory 26 as described above, it becomes necessary to read the coordinate picture element information of the object images corresponding thereto in accordance with the indicating data of this object out of the object image memory 10.

(2-1) Read-out of the Vertical Coordinate of the Object

In the indicator of the embodiment provided therein is a synchronizing signal generator 28 which outputs a horizontal synchronizing signal 100 of raster image-indicating and a line count signal 102 showing a raster scanning position. Then, whenever the above mentioned horizontal synchronizing signal 100 is output from the synchronizing signal generator 28, the control circuit 24 reads and outputs all of the indicating data of each object stored in the object data memory 26 from an object 1 through an object N in order.

When a line signal 104 is output from the object data memory 26, to an adder 30 this line signal is added to the above mentioned line count signal 102 being output from the synchronizing signal generator 28, and output as a line position signal 106. Here, when the raster image scanning is commenced from the upper end of image display screen on the CRT, the line count signal 102 shows in hexadecimal digit the counted numbers of the horizontal sunchronizing signal 100 which is output upon such commencement. Therefore, the number of this line counted signal 102 is increased according as progress of raster image scanning on the CRT. On the other hand, the line signal 104 read out of the object data memory 26 represents by a compliment of hexadecimal digit a vertical coordinate position of the object indicated on the CRT. Accordingly, providing that the line count signal 102 and the line signal 104 described above are added in the adder 30, when the raster scanning position on the CRT reaches the vertical coordinate position set by the line signal 104, a line position signal 106 which is output from the adder 30 is counted up from $FF to $00 in hexadecimal digit notation and directs to start reading the coordinate picture element information out of the object image memory 10.

The line position signal 106 thus output from the adder 30 is supplied to a comparator 32 together with a vertical scale factor signal 108 of the object read out of the object data memory 26. This comparator 32 judges whether the object can be image-indicated on the CRT or not in accordance with the signals 106 and 108 thus supplied, and outputs a matching signal 110 in such case that the image can be indicated. In other words, this comparator 32 compares the values of the vertical scale factor signal 108 and the ones of the signal which is supplied from the adder 30. Then, only when the signal of the line position signal 106 supplied from the adder 30 is smaller than the vertical scale factor signal 108, the comparator judges that the object can be indicated on the CRT and outputs the matching signal 110. Furthermore, this matching signal 110 is output, and the control circuit 24 performs its reading action. When this matching signal 110 is stopped off, the control circuit 24 switches the reading of the object indicating data out of the object data memory 26 over to the reading of the object indicating data regarding the next object, since the image indication cannot be performed on the CRT with regard to the object whose corresponding datais being read out of the object data memory 26 at present. Consequently, the only indicating data of the object which can be image-indicated on the CRT is quickly read out of the object data memory 26, and the signal process required for the image indication can be performed.

A line converter 34 reads out the object images specified by an object identification signal 112 out of the object image memory 10 in accordance with the value of the line position signal 106 being thus output from the adder 30.

(2—2) Scale-up and Scale-down of Vertical Coordinate

This embodiment is characterized in that as a scale up and scale down circuit the line converter reading the coordinate picture element information out of the object image memory 10 at a predetermined scale factor code is used and formed so that a line selecting signal can read the above mentioned scale factor code at a predetermined scale factor reading code corresponding to each established scale factor. Consequently, this line converter 34 line-selects and reads out of the object image memory 10 the coordinate picture element information which is specified by the object identification signal 112 at the scale factor which is specified by the vertical scale factor signal 108, and the object can be indicated on the CRT at a predetermined established scale factor.

In Table 1 shown is an example of this scale factor code. The vertical axis shows the vertical scale factor signal 108 and the horizontal axis shows the vertical coordinate value of the coordinate picture element information being read out in accordance with the above mentioned scale factor signal 108.

TABLE I

| | | VERTICAL COORDINATE VALUE $ | | | | | | | | | | | | | |
|---|---|---|---|---|---|---|---|---|---|---|---|---|---|---|---|
| | $ | 00 | 01 | 02 | 03 | 04 | 05 | 06 | 07 | 08 | 09 | 0A | 0B | 0C | 0D |
| VERTICAL SCALE FACTOR SIGNAL | 00 | X | X | X | X | X | X | X | X | X | X | X | X | X | X |
| | 01 | 0 | X | X | X | X | X | X | X | X | X | X | X | X | X |
| | 02 | 0 | 4 | X | X | X | X | X | X | X | X | X | X | X | X |
| | 03 | 0 | 2 | 4 | X | X | X | X | X | X | X | X | X | X | X |
| | 04 | 0 | 2 | 4 | 6 | X | X | X | X | X | X | X | X | X | X |
| | 05 | 0 | 1 | 2 | 4 | 6 | X | X | X | X | X | X | X | X | X |
| | 06 | 0 | 1 | 2 | 4 | 5 | 6 | X | X | X | X | X | X | X | X |

TABLE I-continued

| | VERTICAL COORDINATE VALUE $ | | | | | | | | | | | | | |
|---|---|---|---|---|---|---|---|---|---|---|---|---|---|---|
| $ | 00 | 01 | 02 | 03 | 04 | 05 | 06 | 07 | 08 | 09 | 0A | 0B | 0C | 0D |
| 07 | 0 | 1 | 2 | 3 | 4 | 5 | 6 | X | X | X | X | X | X | X |
| 08 | 0 | 1 | 2 | 3 | 4 | 5 | 6 | 7 | X | X | X | X | X | X |
| 09 | 0 | 0 | 1 | 2 | 3 | 4 | 5 | 6 | 7 | X | X | X | X | X |
| 0A | 0 | 0 | 1 | 2 | 3 | 4 | 4 | 5 | 6 | 7 | X | X | X | X |
| 0B | 0 | 0 | 1 | 2 | 2 | 3 | 4 | 4 | 5 | 6 | 7 | X | X | X |
| 0C | 0 | 0 | 1 | 2 | 2 | 3 | 4 | 4 | 5 | 6 | 6 | 7 | X | X |

Here, the vertical scale factor signal 108 standerdizes line numbers of the coordinate picture element information of each object image stored in the object image memory 10, that is, eight lines, and is represented at line numbers of the coordinate picture element information which line-convert and read these eight line coordinate picture element information. Therefore, in such case that the scale factor to the vertical direction is set at "1", the vertical scale factor signal comsists of the same value of the line numbers of the coordinate picture element information, that is, eight. When the vertical scale factor signal 108 is smaller than the value of this number, eight, a scale down image is indicated, and, when the vertical scale factor signal 108 is larger than the value of eight, a scale up image is indicated.

Accordingly, when the vertical scale factor signal 108 is ($04), for example, a charactor code ($01) coordinate picture element signal being line-converted and read out of this object image memory 10 is formed with scale-down of 4/8 to the vertical direction as shown in FIG. 5. On the other hand, when the vertical scale factor signal 108 is established at the value of ($0C), in the same manner, a charactor code ($01) image picture element signal is image-indicated as enlarged by 12/8 times as shown in FIG. 6.

Thus, in accordance with the supplied vertical scale factor signal 108 the line converter 34 line-converts and reads out the coordinate picture element information of the object images specified by the object identification signal 112 in responce to a predetermined established scale factor, and adjusts the established scale factor of the object in the vertical direction on the CRT.

(2—3) Scale-up and Scale-down of Horizontal coordinate

Then, the coordinate image picture element signals of the object images being thus line-converted and read out by the line converter 34 are supplied to a shift register 36. This shift register 36 converts the picture element signal being read out of the object image memory 10 at every other line from parallel to series, and supplies to a color encoder 38. This color encoder 38 gives a predetermined color process to the coordinate picture element signal supplied from the shift register 36 in accordance with a color slection signal 114 being read out of the object data memory 26 and inputs to a buffer memory 40. Every line of thus input coordinate picture element signal is written and stored in this buffer memory 40 as picture image information.

Figure 7:
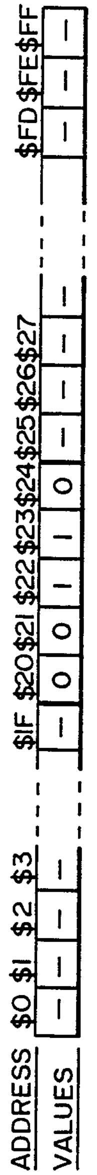
FIG. 7 is an explanatory view of a buffer memory.

Here, the buffer memory 40 has recording capacity being equal to dot numbers which compose scanning lines of the CRT in the horizontal direction, that is, dot numbers which are represented by FF of hexadecimal digit notation, and, as shown in FIG. 7, the addresses represented at hexadecimal digit from the one end toward the other end corresponding to the picture image signal read-out in this horizontal direction are established from $00 through $FF.

Then, the write-in addresses of the picture image signal into this buffer memory 40 is established by an address counter 42. In the embodiment this address counter 42 has 8 bit binary counters connected to the respective addreses of the buffer memory 40, and selects the write-in addresses of the buffer memory 40 in accordance with the horizontal position signal 116 read out of the object data memory 26. The write-in actions of the picture element signal into the addreses being thus selected by the address counter 42 are performed as hereinafter described.

Figure 8:
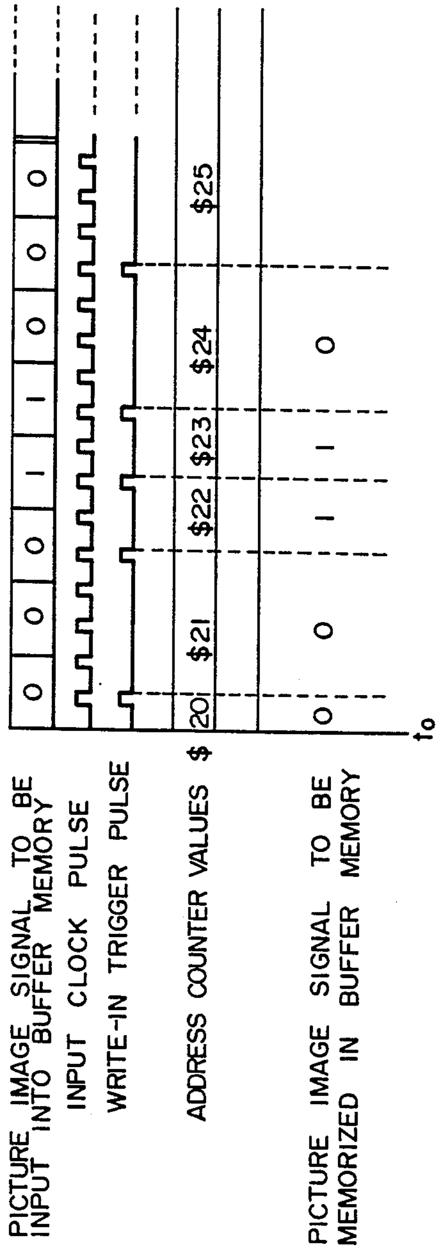
FIG. 8 is a timing chart showing a writing action of the picture element signal into the buffer memory.

One line amount of picture element signal converted into series in the shift register 36 is in order supplied to the buffer memory 40 as 8 dot data. Here, as shown in FIG. 7, when the write-in address selected by the address counter 42 is set at ($20), in such case that the series-converted 8 bit picture element data (00011000) is input in order, for example, the write-in actions of the respective picture image signals to the buffer memory 40 are performed only when the write-in trigger pulses are synchronized with the input of the respective picture element signals into the buffer memory 40 and are supplied to the address counter 42 as shown in FIG. 8. Therefore, even if the picture element signal is input to the buffer memory 40, this picture element signal is not stored in the buffer memory 40, if the write-in pulse is not supplied to the address counter 42 at the time of its input.

In order to indicate an object on the CRT in the same size with the case in which the object image stored in the object image memory 10 is read out as it is, it is necessary to input 8 pieces of write-in trigger pulse into the address counter 42 within one unit time, that is to say, a time required to read into the above mentioned buffer memory the 8 dot picture element information which is converted to series at the shift register 36.

Therefore, on the basis of 8 pieces of write-in trigger pulse per one unit time, in case the pulse number ratio of the write-in trigger pulse per one unit time is larger than 1, the scale factor of the object in the horizontal direction on the CRT becomes larger than 1, and in case the pulse number ratio per one unit time is smaller than 1, the scale factor of the object on the CRT becomes smaller than 1.

The characteristic feature of the present invention resides in that, as the scale-up and scale-down circuit, the write-in trigger pulse with the pulse number ratio in responce to the predetermined established scale factor is supplied to the address counter 42, a pulse generator 44 is prepared in order to scale up or scale down the write-in address addressed by the address counter 42 at the pulse number ratio, the picture element information is written in the buffer memory at the predetermined established scale factor, and the object can be indicated on the CRT at the predetermined scale factor.

In the embodiment, this pulse generator 44 is formed by n bit binary rate multipliers, and the horizontal scale factor signal 118 read out of the object data memory 26 is supplied to its rate input terminal. This binary rate multiplier is a circuit that its output pulse number can be established by the signal supplied to the rate input terminal when it is input $2^n$ pieces of clock pulse. For this, the horizontal scale factor signal 118 supplied to this rate input terminal can establish the write-in trigger pulse number output from the binary rate multiplier at an optional value. For example, since 4 bit binary rate multiplier is supplied 16 ($2^4$) pieces of pulse to the clock pulse input terminal as shown in FIG. 6, the binary rate multiplier outputs 5 pieces of write-in trigger pulse, when the rate input is set 5.

Here, this rate multiplier requires to output pieces of the write-in trigger pulse 120, pieces of which are directed by the output scale factor signal 118, with synchronization to the input of picture image signal to the buffer memory 40. Accordingly, in this embodiment, the unit time in which 16 ($2^4$) pieces of clock pulse are input to this rate multiplier is determined equally to the time in which one time of picture image signal is input to the buffer memory 40 so that the write-in trigger pulse 120 is output with synchronization to the write-in of the picture image signal to the buffer memory 40.

To the address counter 42, therefore, input is the write-in trigger pulse 120 which is established at a pulse number ratio directed by the horizontal scale factor signal 118, and the picture element signal is written into the buffer memory 40 at a certain predetermined scale factor. Consequently, the object can be indicated to the horizontal direction at a certain predetermined scale factor.

Figure 9:
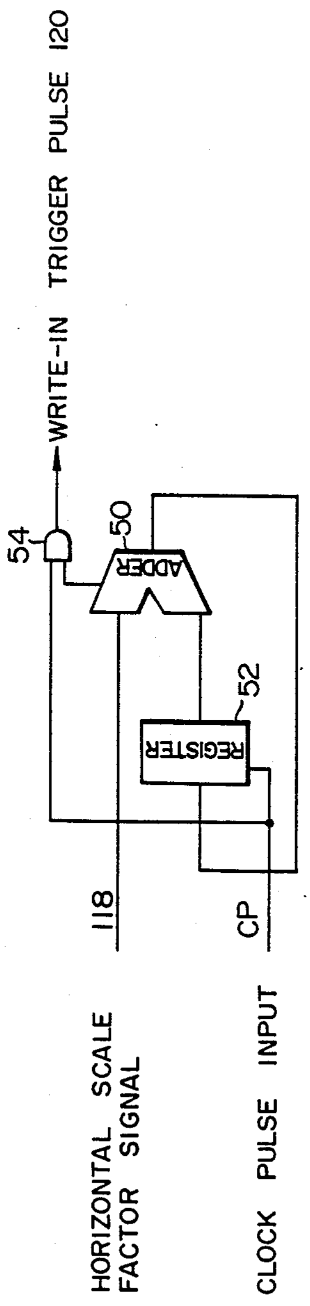
FIG. 9 is a circuit diagram showing another embodiment of a pulse generator.
Figure 10:
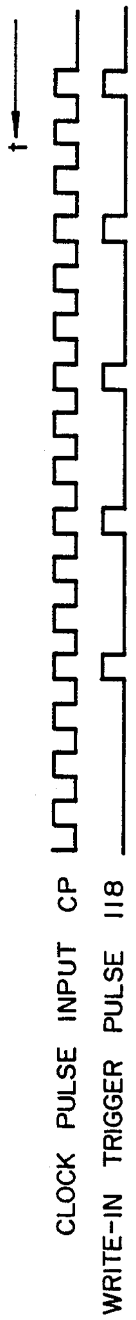
FIG. 10 is a timing chart of the pulse generator illustrated in FIG. 9.

Incidentally, in this embodiment, the rate multiplier is used as the pulse generator 44, but, without limiting this, this pulse generator 44 can be formed with a 4 bit adder 50, a 4 bit register 52 and an AND gate 54 as shown in FIG. 9. In the above mentioned circuit input therein are 16 pieces of clock pulse CP per one unit time, and also input therein is horizontal scale factor signal 118 read out of the objectdata memory 26. In Tables 2 and 3 shown therein are the input and output data in such case that the write-in trigger pulse numbers are set at 5 and 10 per unit time in the circuit show in FIG. 9. FIG. 10 shows a timing chart in such case that the write-in trigger pulse numbers are set at 5 per unit time.

TABLE 2

SCALE-DOWN CASE

| CLOCK CP | A | B | C | D |
|---|---|---|---|---|
| 1 | 0101 | 0000 | 0101 | |
| 2 | 0101 | 0101 | 1010 | |
| 3 | 0101 | 1010 | 1111 | |
| 4 | 0101 | 1111 | 0100 | O |
| 5 | 0101 | 0100 | 1001 | |
| 6 | 0101 | 1001 | 1110 | |
| 7 | 0101 | 1110 | 0011 | O |
| 8 | 0101 | 0011 | 1000 | |
| 9 | 0101 | 1000 | 1101 | |
| 10 | 0101 | 1101 | 0010 | O |
| 11 | 0101 | 0010 | 0111 | |
| 12 | 0101 | 0111 | 1100 | |
| 13 | 0101 | 1100 | 0001 | O |
| 14 | 0101 | 0001 | 0110 | |
| 15 | 0101 | 0110 | 1011 | |

TABLE 2-continued

SCALE-DOWN CASE

| CLOCK CP | A | B | C | D |
|---|---|---|---|---|
| 16 | 0101 | 1011 | 0000 | O |

A: Horizontal Scale Factor Signal 118
B: Output of Register 52
C: Output of Adder 50
D: Write-in Trigger Pulse 120

TABLE 3

SCALE-UP CASE

| CLOCK CP | A | B | C | D |
|---|---|---|---|---|
| 1 | 1010 | 0000 | 1010 | |
| 2 | 1010 | 1010 | 0100 | O |
| 3 | 1010 | 0100 | 1110 | |
| 4 | 1010 | 1110 | 1000 | O |
| 5 | 1010 | 1000 | 0010 | O |
| 6 | 1010 | 0010 | 1100 | |
| 7 | 1010 | 1100 | 0110 | O |
| 8 | 1010 | 0110 | 0000 | O |
| 9 | 1010 | 0000 | 1010 | |
| 10 | 1010 | 1010 | 0100 | O |
| 11 | 1010 | 0100 | 1110 | |
| 12 | 1010 | 1110 | 1000 | O |
| 13 | 1010 | 1000 | 0010 | O |
| 14 | 1010 | 0010 | 1100 | |
| 15 | 1010 | 1100 | 0110 | O |
| 16 | 1010 | 0110 | 0000 | O |

A: Horizontal Scale Factor Signal 118
B: Output of Register 52
C: Output of Adder 50
D: Write-in Trigger Pulse 120

(2–4) Write-in and Read-out of Buffer Memories

The indicating apparatus of this embodiment simultaneously performs the write-in of the picture elementsignal to the buffer memory 40 as mentioned above and the read-out of one line of picture image data written in this buffer memory 40, and is provided two pairs of buffer memory 40 and address counter 42 which directs the write-in address in the buffer memory 40 so that a plurality of objects can be indicated on one image display screen. A multiplexer is utilized to alternately perform the write-in and read-out actions of the picture element signal to each of the buffer memories 40. The multiplexer 46 selects the write-in and read-out actions of the picture element signal thereof in responce to the change-over signal $P_1$ applied from the synchronizing signal generator 28. Each of the output terminals of the buffer memories 40 is provided a change-over switch 48 which selects its outputs. Picture image signal is written into one buffer memory while the read-out action is performed at the other buffer memory. This change-over switch 48 is switched in accordance with the change-over signal $P_1$ output from the synchronizing signal generator 28 in the same manner as the above mentioned multiplexer 46.

Through these actions described above, the write-in of the picture element signal to the buffer memory 40 and the read-out of the picture image data written in this buffer memory 40 can be simultaneously performed and a plurality of objects can be indicated on one image display screen.

The indicating apparatus of this embodiment is composed as has been described in the above and its operation will be hereinafter described.

In this embodiment, for example, indicated is an object image specified by a character code ($01) at a position on a CRT specified by a line signal 104 of ($FA) at a scale factor of 1.

In such case, object indicating data consisting of object identification signal ($00) which specifies an indicating object by CPU 22, line signal ($FA) which directs a indicating position of the object, and vertical scale factor signal ($08) which directs a scale factor to the vertical direction of the object, is processed and written to be stored in the object data memory 26.

Figure 11:
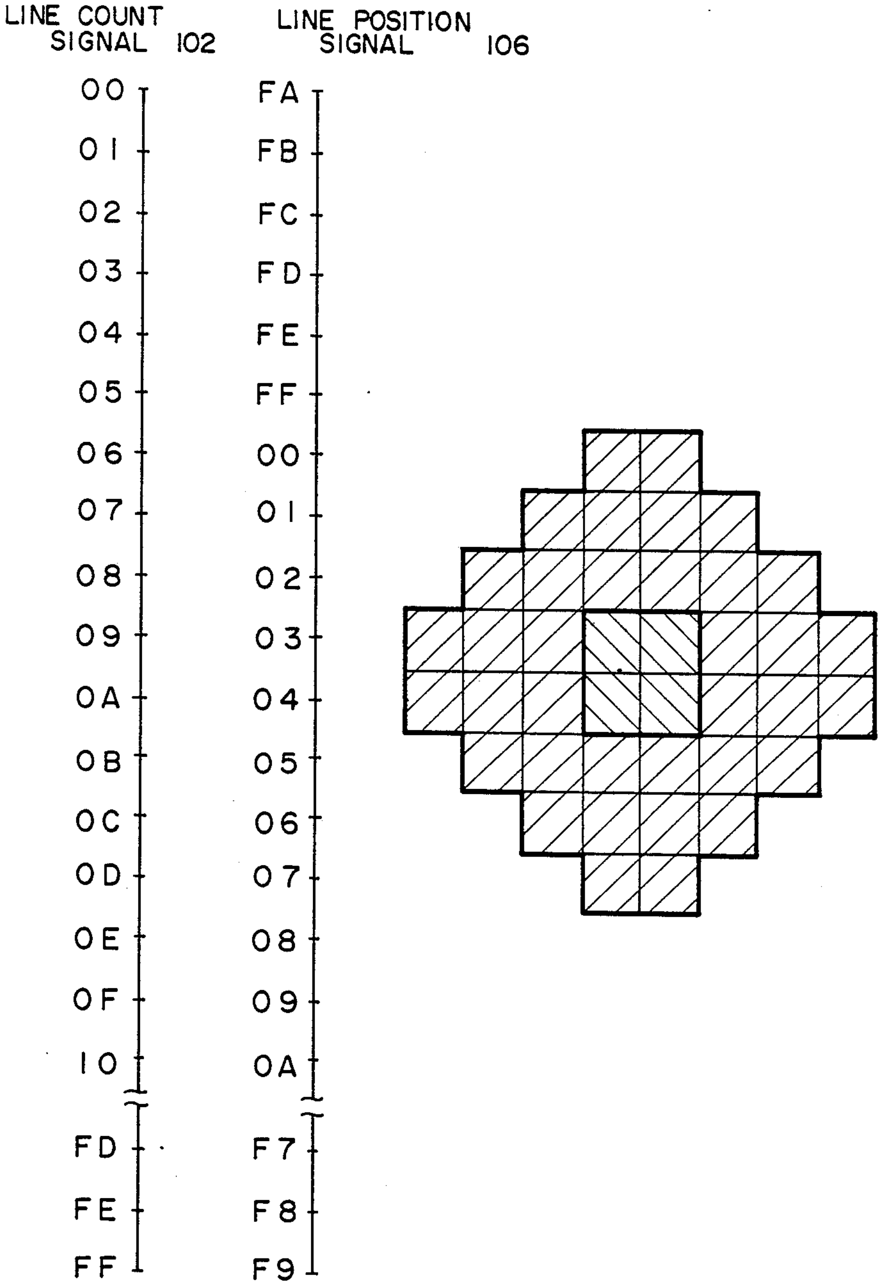
FIGS. 11 through 13 are explanatory views displaying picture images of an object on the CRT.

The object indicating information thus stored in the object data memory 26 is all read out whenever the control circuit 24 outputs the horizontal synchronizing signal 100. Out of the object indicating data which has been read out, the line signal 104 is added to the line count signal 102 in the adder 30 to be output as line position signal 106 which directs the indicating position of the object. In FIG. 11 shown therein is a relation between the line position signal 106 thus supplied and theraster scanning position on the CRT. When the value of the line position signal output from the adder 30 becomes ($00), the line converter 34 starts reading out of the object image memory 10 the object image specified by the object identification signal ($01).

Here, as the vertical scale factor signal 108 of the object is represented by ($08) in this embodiment, the read-out action of the object image specified by the character code ($01) is performed on the basis of line selecting signal specified by the vertical scale factor signal ($08) in the Table 1. At this point, since the line selecting signal specified by the vertical scale factor signal ($08) corresponds by one to one with the number of each line of the coordinate picture element information stored in the object image memory 10 and with the value of the vertical coordinate read out of this object image memory 10, the coordinate picture element information of the object image stored in the object image memory 10 can be read out at every one line one after another.

The signal thus read out is input to the shift register 36 at every picture element signal of each line, and is, right here, written and stored in the buffer memory 40 after parallel-series conversion.

At this point, since the horizontal scale factor signal 118 is ($08), the pulse generator 44 outputs the write-in trigger pulse 120 having pulse number ratio of 1 corresponding to the established scale factor of 1. In the buffer memory 40, therefore, every one time of picture element information supplied from the shift register 36 after series conversion is written and stored as it is in accordance with the selected address by the address counter 42.

Accordingly, when the picture image information thus written and stored in the buffer memory 40 is read out one after another and raster image-indicated, the object image represented by charactor code ($01) can be displayed as it is on the CRT as shown in FIG. 11.

Here, the coordinate picture element information stored in the object image memory 10 is memorized with information amount of 8×8 bits, and also the object indicated on the CRT is represented with the picture image of 8×8 dots in the same manner. The object, therefore, is image-indicated on the CRT with the established scale factor "1".

Described in the above is the case that the object is image-indicated on the CRT at the factor "1". The indicating apparatus in the present invention can display the object on the CRT at a certain established scale factor without limiting the above mentioned scale factor "1".

For example, considered is such case that the object image specified by the charactor code ($01) is indicated on the CRT with scale-down as 4×5 dot picture image.

In this case, the indicating information of the object is processed by the CPU 22 as described previously and written and stored in the object data memory 26. Right here, in case of indicating 4×5 dot picture image the signal of ($04) is memorized as the vertical scale factor signal 108, and the signal of ($05) is memorized as the horizontal scale factor signal 118.

Accordingly, the read-out action of the coordinate picture image information out of the object image memory 10 is performed on the basis of the line conversion signal specified by the vertical scale factor signal ($04). In other words, in the Table 1, on the basis of the line conversion signal specified by the vertical scale factor signal ($04) the object picture image data specified by the character code ($01) is read out of the object image memory 10 as picture image signal of 4 lines as shown in FIG. 5.

The signal hus read out is supplied to the buffer memory 40 after parallel-series conversion at every one line in the shift register 36 in the same way as described before.

Since the horizontal scale factor signal 118 read out of the object data memory 26 is ($05) at this point, the pulse generator 44 outputs the write-in trigger pulse 120 with the pulse number ratio ($\frac{5}{8}$) specified by this horizontal scale factor signal. Therefore, as shown in the FIG. 8, the picture element signal of each line to be input is written in and stored in the buffer memory 40 with the scale-down from the 8 dot information to the 5 dot information.

Figure 12:
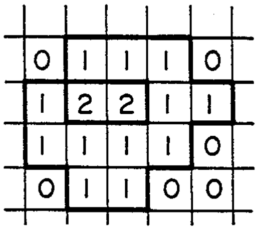

Accordingly, when the picture image data thus written into the buffer memory 40 is read out at every one line and raster image-indicated on the CRT, the object image specified by the charactor code ($01) is indicated with scale-down on the CRT as the 4×5 dot object as shown in FIG. 12. In other words, in comparison with the 8×8 dot picture image shown in FIG. 11, the object is indicated with scale-down at (4/8) in the vertical direction and at ($\frac{5}{8}$) in the horizontal direction.

In the same manner, accordint to the present invention, an object can optionally be image-indicated on the CRT with scale-up at a requested scale factor.

The image indicating apparatus in the present invention can also image-indicate a plurality of objects on the CRT with scale-up or scale-down at the same time. When ($FA) is established as the line signal 104 of the first object and ($S7) is established as the line signal 104 of the second object, for example, these first and second objects are raster image-indicated at the vertical coordinate position where the line position signal 106 supplied from the adder 30 respectively become ($00).

As described heretofore, the apparatus in the present invention can image-indicate requested objects on the CRT with scale-up or scale-down at optional scale factors and is considered to be of its wide use.

When the apparatus in this invention is used as the image indicator of the video game target, for example, a plurality of targets can be image-indicated on the CRT with scale-up or scale down at requested positions at optional scale factors. FIG. 4 shows a picture screen of drive game thus image-indicated. In such drive game, the objects are image-indicated on CRT as cars coming to and passing by with scale-up or scale-down at requested scale factors.

Figure 15:
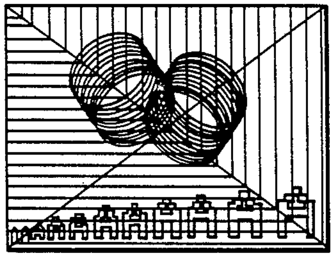
FIGS. 14 and 15 are explanatory views of picture images of the objects displayed with scale up or down by the indicator according to the present invention.
Figure 14:
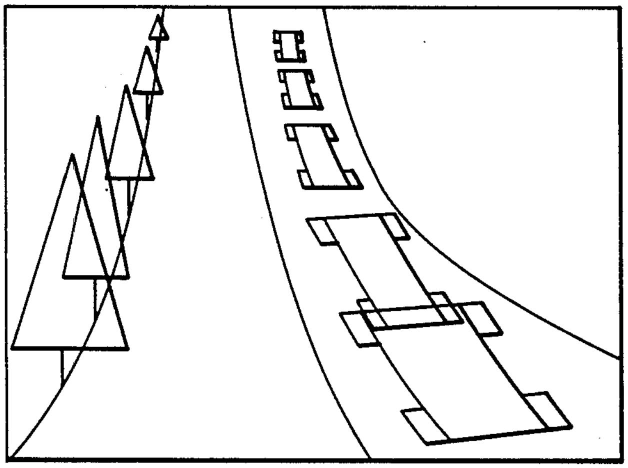
Figure 13:
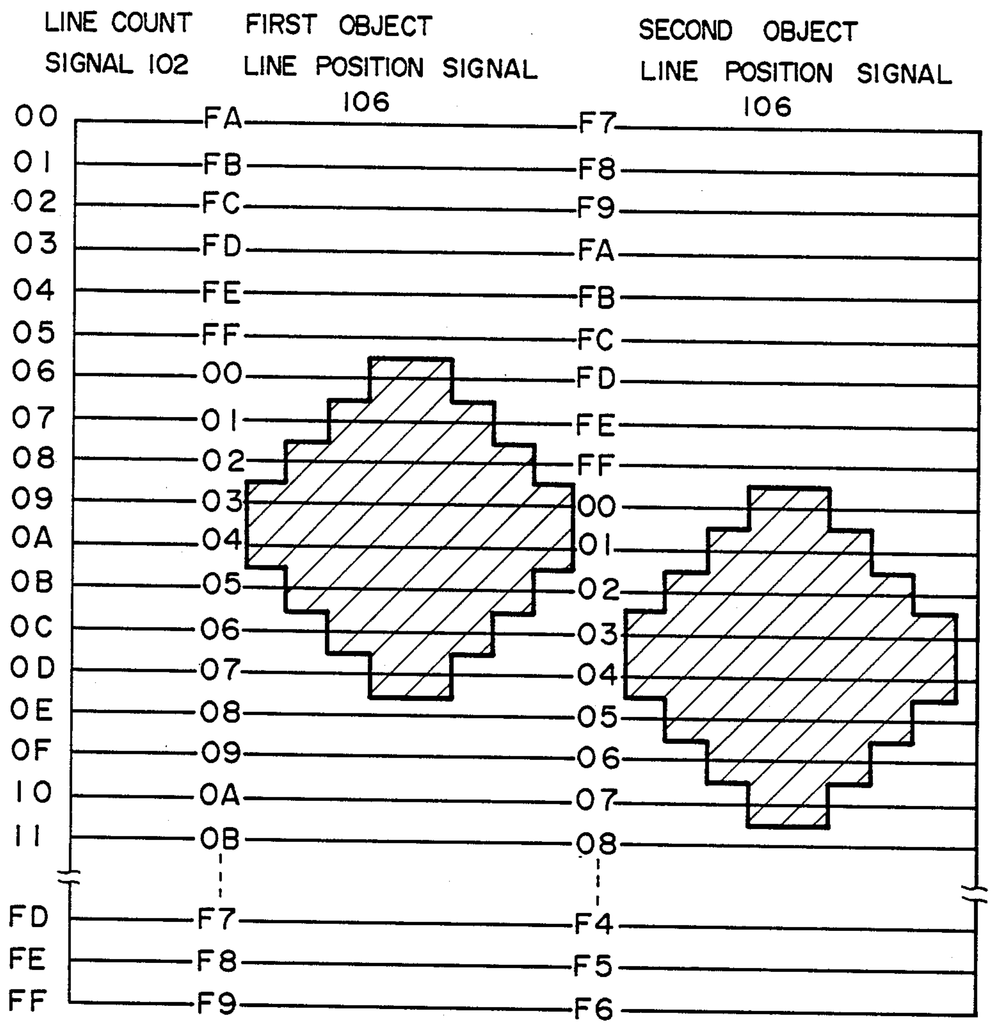

FIG. 15 shows one example of picture image of the case in which the indicating apparatus of this invention is used as the simulator.

As described heretofore, according to the present invention, when the coordinate picture element information is read out of the object image memory in which the object image is stored as the coordinate picture element information in the vertical or the horizontal direction and raster image-indicated on the CRT, the objects can be image-indicated on the CRT with scale-down or scale-up at requested scale factors. Especially, according to the indicating apparatus in the present invention, it is preferable that a plurality of the objects are continuously image-indicated on the CRT with scale-up or scale-down at requested scale factors and its use can be widely considered.

We claim:

1. An object image indicating apparatus in a video game machine which includes an object image memory wherein a plurality of object images are respectively memory wherein a plurality of object images are respectively stored as vertical or horizontal directional coordinate picture element information, said object image indicating apparatus reading out said coordinate picture element information of each object image from said object image memory and displays said object image as a raster image on a CRT, comprising:

a processing circuit for processing and supplying, in accordance with an external input signal and a predetermined program, a group of signals comprising an object identification signal which specifies an object image to be displayed, a line signal and a horizontal address signal which sets an indicating position for said object image to be displayed, and a vertical scale factor signal and a horizontal scale factor signal which sets a display scale factor for each object to be displayed;

an object data memory for storing for each object image display information comprising the group of signals supplied from said processing circuit;

a synchronizing generator for supplying a horizontal synchronizing signal for each horizontal scan and for supplying a line count signal which counts said horizontal synchronizing signal and determines a vertical raster scanning position on said CRT;

a control circuit for reading out one after another display information at all the object images stored in said object data memory at every output of said horizontal synchronizing signal;

an adder for adding said line signal for each object image which is read out one after another from said object data memory aft every output of said horizontal synchronizing signal and said line count signal which is supplied fromsaid synchronizing generator and for processing and supplying a line position signal for each object image one after another;

a line converter, which includes a vertical scale factor code which is set beforehand to line-convert eachl line position signal in accordance with a vertical scale factor signal and provide a line select signal which specifies the read-out address of said object image memory, for forming a coordinate picture element information read-out address of an object image which is specified by the object identification signal supplied by said object data memory, based upon said vertical scale factor code, in response to the vertical scale factor signal supplied by said object data memory and line position signal supplied by said adder and for supplying said read-out address to said object image memory;

a shift register for parallel-series converting and supplying picture element information for each object image which is supplied one after another from said object image memory;

buffer memories including a storing area which corresponds to a horizontal scanning line, said buffer memories, at every output of said horizontal synchronizing signal, storing, in an area of said storing area which is specified by a write-in address, coordinate picture element information for each object image which is parallel-series converted and supplied one after another from said shift register as an image signal for the scanning raster;

address counters for setting a write-in address for said buffer memory for each object image in accordance with a horizontal address signal for each object image which is read out one after another from said object data memory at every output of said horizontal synchronizing signal;

a pulse generating circuit for inputting, based upon said horizontal scale factor signal for each object image which is supplied from said object data memory, write-in trigger pulse of a pulse number ratio in accordance with the horizontal scale factor to said address counters and for scaling up or down a write-in address area which said address counters set in response to the pulse number ratio;

whereby at every output of the horizontal synchronizing signal, coordinate picture element information for each object which is displayed on a horizontal line is written into said buffer memories one after another in accordance with the vertical scale factor signal and horizontal scale factor signal for each object image, and a means for displaying a plurality of object images on said CRT at predetermined scale factors different from one another in either the vertical or horizontal directions by means of raster scanning on the CRT one after another the picture image signal which is written into said buffer memories is provided.

2. An object image indicating apparatus according to claim 1 further comprising:

a comparator which judges whether the object image can be displayed on the CRT on the basis of the line position signal output from said adder and the vertical scale factor signal read out of said object data memory and which outputs a match signal when the picture signal can be indicated.

* * * * *